US007886889B2

(12) United States Patent
Stein

(10) Patent No.: US 7,886,889 B2

(45) Date of Patent: Feb. 15, 2011

(54) METHOD AND DEVICE FOR ACCEPTING BANKNOTES

(75) Inventor: Dieter Stein, Holzkirchen (DE)

(73) Assignee: Giesecke & Devrient GmbH, Munich (DE)

(*) Notice: Subject to any disclaimer, the term of this patent is extended or adjusted under 35 U.S.C. 154(b) by 202 days.

(21) Appl. No.: 11/792,414

(22) PCT Filed: Dec. 12, 2005

(86) PCT No.: PCT/EP2005/013295

§ 371 (c)(1),
(2), (4) Date: Apr. 7, 2008

(87) PCT Pub. No.: WO2006/063761

PCT Pub. Date: Jun. 22, 2006

(65) Prior Publication Data

US 2009/0095663 A1 Apr. 16, 2009

(30) Foreign Application Priority Data

Dec. 15, 2004 (DE) ....................... 10 2004 060 316

(51) Int. Cl.
*G06K 9/00* (2006.01)
*G07D 7/00* (2006.01)

(52) U.S. Cl. ....................................................... 194/207

(58) Field of Classification Search ................. 194/205, 194/206, 207

See application file for complete search history.

(56) References Cited

U.S. PATENT DOCUMENTS

| | | | | |
|---|---|---|---|---|
| 4,166,945 | A * | 9/1979 | Inoyama et al. | 235/379 |
| 5,247,159 | A | 9/1993 | Yuge et al. | |
| 6,778,693 | B2 * | 8/2004 | Jones et al. | 382/135 |
| 7,152,744 | B2 | 12/2006 | Kunz et al. | |
| 7,201,340 | B2 | 4/2007 | Dietrich et al. | |
| 2003/0132281 | A1 | 7/2003 | Jones et al. | |
| 2004/0012144 | A1 | 1/2004 | Matzig et al. | |

(Continued)

FOREIGN PATENT DOCUMENTS

DE 27 60 269 C2 3/1987

(Continued)

OTHER PUBLICATIONS

Search Report of German PTO regarding German Patent Application No. 10 2004 060 316 2, Nov. 22, 2005.

*Primary Examiner*—Stefanos Karmis
*Assistant Examiner*—Mark J Beauchaine
(74) *Attorney, Agent, or Firm*—Bacon & Thomas, PLLC

(57) ABSTRACT

The present invention concerns a method and an apparatus for accepting bank notes.

In accepting bank notes by means of an apparatus for accepting bank notes it is assumed that the bank notes are inserted in an input pocket, the bank notes are singled by means of a singling device and transported by means of a transportation device, in order to check the individual bank notes by means of a sensor device, and, in dependence on the checking, store them in at least one storage container or return them in the case that it is impossible to check them, wherein returned bank notes can be inserted in the input pocket again, and an instruction to accept and store the returned bank notes is inputted, whereupon these are accepted and stored in the at least one storage container.

7 Claims, 1 Drawing Sheet

U.S. PATENT DOCUMENTS

| | | | | |
|---|---|---|---|---|
| 2004/0026498 | A1 * | 2/2004 | Fujioka | 235/379 |

FOREIGN PATENT DOCUMENTS

| | | | |
|---|---|---|---|
| DE | 100 30 221 | A1 | 1/2002 |
| DE | 100 50 486 | A1 | 4/2002 |
| EP | 1 418 549 | A1 | 5/2004 |
| EP | 1 467 327 | A2 | 10/2004 |

* cited by examiner

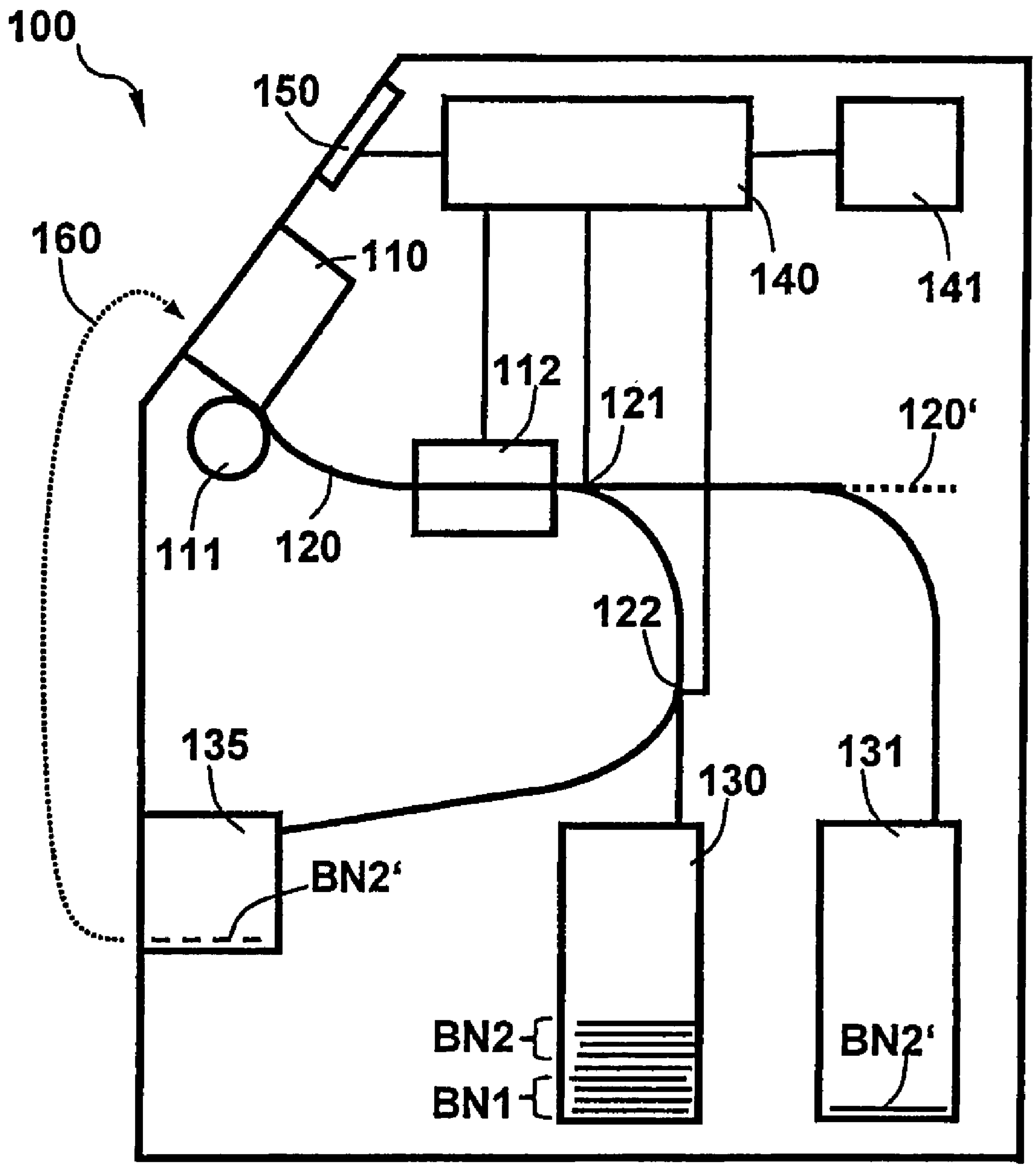
Fig.

METHOD AND DEVICE FOR ACCEPTING BANKNOTES

The present invention relates to a method and an apparatus for accepting bank notes.

In known methods and corresponding apparatus for accepting bank notes it is provided that a depositor, who inserts a certain number of bank notes, in the following referred to as deposit, in the apparatus for acceptance. The inserted bank notes are for example checked for authenticity, currency and denomination, in order to determine a total amount of the deposit. The checked bank notes are transported to a storage container by the apparatus and stored there. Therein it can also be provided that the bank notes contained in the storage container are dispensed again by the apparatus, e.g. as payout or change.

The known apparatus are on the one hand for example used as deposit apparatus or payout apparatus, in which the depositor and recipient of the payout identifies himself, for example by using a check card, the data of which, e.g. account number, are read out. The total amount determined for the deposit is then credited to the corresponding account number or the paid out amount is debited.

On the other hand it is known to use the apparatus together with a cash register. In this case an amount to be paid is reported to the apparatus by the cash register. The depositor or a cashier insert a corresponding amount, which can consist of several bank notes, in the apparatus, which determines the total amount in the above-described manner and compares it with the amount to be paid. For the case that the deposited amount is insufficient, it can be provided that the deposit of further bank notes is requested. For the case that the deposited amount exceeds the amount to be paid, it can be provided that the apparatus dispenses bank notes as change.

However, the known methods and the corresponding apparatus have the disadvantage that the deposit procedure is strongly impeded in the event that some of the inserted bank notes cannot be recognized by the apparatus and are therefore not accepted, i.e. are returned to the depositor. In this case the complete deposit procedure is delayed or rendered completely impossible.

It is therefore the object of the present invention to specify a method and an apparatus for accepting sheet material that permit to improve and speed up the acceptance of bank notes, even if the bank notes cannot be properly checked or recognized by the apparatus.

This problem is solved according to the invention by the features of the independent claims.

In accepting bank notes by means of an apparatus for accepting bank notes it is assumed that the bank notes are inserted in an input pocket, the bank notes are singled by means of a singling device and are transported by means of a transportation system, in order to check the individual bank notes by means of a sensor device, and to store them in dependence on the check in at least one storage container or to return them in the case that they cannot be checked, wherein returned bank notes can be inserted in the input pocket again, and an instruction to accept and store the returned bank notes is input, following which these are accepted and stored in the at least one storage container.

The advantage of the invention is primarily to be seen in that disturbing interruptions and impediments of deposit procedures can be prevented, if bank notes classified as acceptable by a trustworthy person, e.g. a cashier or an employee of a bank, returned by the apparatus for accepting bank notes, are nevertheless accepted by the apparatus.

Further advantages of the present invention appear from the dependent claims as well as the following description of an exemplary embodiment with reference to a FIGURE.

To facilitate comprehension in the following only those components are described which are of importance in connection with the present invention.

The single FIGURE shows an exemplary embodiment of an apparatus for accepting bank notes.

Deposits consisting of bank notes BN1, BN2 were inserted one after another in an input pocket 110 by depositors. The bank notes BN1, BN2 of each deposit were transferred individually by a singling device 111 to a transportation system 120, which guides the bank notes BN1, BN2 through a sensor device 112, which is connected to a control device 140. The sensor device 112 by means of its sensors deduces data from the individual bank note, which data are evaluated by the control device 140. The evaluation comprises checking for authenticity and establishing the type of the bank notes, i.e. the currency and/or denomination of the bank notes. Thereafter the respective bank note is transported by the transportation system 120 via a diverter 121, which is controlled by the control device 140, to a storage container 130, in which it is stored. In the shown example in the storage container 130 already the bank notes BN1 of the first deposit as well as the bank notes BN2 of the second deposit carried out in the shown example are disposed.

As outlined by the dotted prolongation of the transportation system 120', further storage containers can be used in order to be able to store the bank notes of the deposits for example sorted by denomination and/or sorted by currency. For this purpose all bank notes of one denomination and/or all bank notes of one currency are respectively stored in a separate storage container.

All functions of the apparatus 100 are controlled by the control device 140, for example a micro computer. By means of an input/output device 150, which has for example a printer and/or a display and/or a keyboard and/or a touch screen and/or a card reader, the depositor can control the acceptance procedure or the depositor is informed about the acceptance procedure by the apparatus 100. By means of the card reader the depositor can be identified via a check card, which can comprise a magnetic stripe or an electronic circuit. Data of the check card, e.g. an account number, are read out by the card reader, in order to e.g. credit the total amount of the deposit determined by the apparatus 100 to the corresponding account. For this purpose the control device 140 can be connected via an interface 141 to an accounting settlement system e.g. of a bank, to be able to carry out the crediting to the corresponding account.

Bank notes which could not be processed, not be recognized and/or were classified as not authentic in the checking by the sensor device 112, can be returned to the depositor. Such bank notes are referred to as non-recognized bank notes in the following. For this purpose a diverter 122, which is part of the transportation system 120, is operated by the control unit 140 and the non-recognized bank note BN2' is released into an output pocket 135. Instead of a separate output pocket 135 also the input pocket 110 can be used, back to which the non-recognized bank note is guided. For separation subsequently a separation element, for example a plate or a finger, controlled by the control device 140, has to be placed on top of the deposit after the start of processing, so that the returned bank notes are separated from the bank notes of the deposit. Alternatively it is also possible to carry out one or several repeat runs for non-recognized bank notes, in order to reduce the number of non-recognized bank notes. For this purpose the non-recognized bank notes are removed from the output pocket 135 and are inserted again 160 in the input pocket 110. In the case that, as described above, the input pocket 110 is also used for the returning, the separation element is removed.

Bank notes BN2', which cannot be recognized by the apparatus 100, disturb the process of a deposit considerably. In order to enable an acceptance of such bank notes BN2' it is provided that for example by means of the keyboard of the input/output device 150 an instruction to the apparatus 100 or the control unit 140 can be input. When the non-recognized bank note BN2' is inserted in the input pocket 110 again, or if it was inserted already before, or after the separation element was removed, it is accepted by the apparatus 100 and stored, e.g. in the storage container 130. In the acceptance of non-recognized bank notes BN2', in particular if these were classified as not authentic, it can be provided that at least the type of the bank notes BN2', i.e. denomination or currency, are deduced from the data of the sensor device 112. In the case that this is not possible, it can also be provided, as explained in greater detail below, that corresponding data are made available by means of the input/output device 150.

However, the apparatus 100 can also have an additional storage container 131, which is connected to the transportation system 120 via the diverter 121. In this fashion the non-recognized bank notes BN2' can be stored separately from the recognized bank notes BN1, BN2, in order to be able to process them separately later on.

In the acceptance of non-recognized bank notes BN2' furthermore two cases can be distinguished. In the first case only the depositor is present, whereas in the second case in addition to the depositor a further operator is present, e.g. a cashier of a bank or a salesperson in a store. As described above, each depositor has to identify himself for each deposit procedure e.g. by means of the card reader, whereas this is not necessary in the case that a cashier or an employee of a bank or of a store is present. However, it can also be provided that the cashier identifies himself, e.g. when a change of shifts takes place.

In the first case, in which only the depositor is present at the apparatus 100, it can be provided that the depositor makes additional data concerning the non-recognized bank notes BN2' available to the apparatus 100 by means of the input/output device 150, e.g. data concerning the denomination and/or currency of the non-recognized bank note BN2'. These data can for example be preliminarily considered in the accounting of the deposit, e.g. in the crediting of the total amount. However, the final crediting is only carried out subsequent to a repeated processing or examination of the non-recognized bank note BN2', e.g. by an employee of the bank.

Likewise it is possible for the first case that an employee of the bank, e.g. a cashier, is provided with information concerning the non-recognized bank note BN2' via the interface 141, e.g. an image of the bank note. On the basis of this information the cashier can then possibly decide at once which type of bank note is present and/or whether it is authentic. In this manner the crediting of the determined total amount can be carried out immediately.

In the second case, in which in addition to the depositor e.g. a cashier is present at the apparatus 100, who operates the apparatus 100, the cashier can examine and judge the non-recognized bank note BN2'. When the cashier finds that it represents an authentic bank note of a certain currency and denomination, he can input the corresponding information by means of an input/output device 150 as well as initiate the acceptance of the non-recognized bank note BN2'. The crediting of the total amount can then be carried out at once.

The apparatus 100 can also be suitable for dispensing bank notes which are disposed in the storage containers. In this case the apparatus can also carry out payouts. For this purpose in particular also the bank notes BN1, BN2 can be dispensed again, which were accepted before in deposit procedures. However, for reasons of security only such bank notes should be used for dispensing which were recognized by the apparatus 100 or classified as authentic by a cashier. Bank notes the authenticity and type of which is not reliably known, e.g. the bank notes contained in the storage container 131, should not be dispensed, though.

It can furthermore be provided that the apparatus is connected to a cash register, e.g. via the interface 141. The apparatus 100 receives information from the cash register, for example information on a purchasing price to be paid. When bank notes are inserted in the input pocket 110 by a buyer or a cashier, the apparatus 100 or the control device 140 determines the total amount of the bank notes and compares it to the purchasing price. In the case that the determined total amount is lower than the purchasing price, a request to insert further bank notes can be displayed on the input/output device 150 or a display of the cash register. In the case that it is found in the comparison that the total amount is higher than the purchasing price, the apparatus 100 or the control device 140 can determine a change to be paid out and a corresponding amount of bank notes can be dispensed.

It is to be understood, of course, that a supervising person, e.g. a cashier, does not need to be present at the cash register permanently. The cash register can also be embodied as a self-service apparatus, or it can represent a vending machine with a device for accepting money or other self-service apparatus for accepting money. In this case it can be provided that the supervising person is called to the apparatus 100 in the case that problems occur in the acceptance of bank notes. After an examination of the bank note(s) the supervising person can for example initiate the acceptance of the bank note(s) by inputting a secret code by means of the input/output device 150. Likewise, the supervising person can initiate the acceptance for example also by means of a magnetic stripe card or chip card. In this case the input/output device 150 for example has a reading device for the magnetic stripe card or chip card. When the supervising person inserts the magnetic stripe card or chip card in the reading device, controlled by the control device 140, the bank note(s) is/are accepted and accounted.

At a self-service apparatus it is furthermore possible that the acceptance of non-recognized bank notes is also enabled without a supervising person, e.g. a cashier. In this case it is provided that the depositor of the non-recognized bank note(s) identifies himself uniquely. This can for example by done by means of a check card or credit card, which has a magnetic stripe or a chip card. By means of the above described reading device the identity of the depositor can be determined and be stored by the control device 140. Since the control device 140 connects the thus deposited bank note(s) with the identification of the depositor, a corresponding tracking and accounting can be carried out also later on, in the event that it e.g. turns out that the money is counterfeited.

The invention claimed is:

1. A method for accepting bank notes by means of an apparatus for accepting bank notes, comprising the following steps:

a) inserting bank notes in an input pocket, b) singling the bank notes by means of a singling device and transporting the individual bank notes by means of a transportation system, c) checking the individual bank notes by means of a sensor device, d) storing the bank notes in at least one storage container, in dependence on the checking of the bank notes, and e) returning bank notes which have been classified as not authentic, f) inserting returned bank notes in the input pocket, and g) inputting an instruction to accept and store the returned bank notes, as well as accepting and storing the returned bank notes in the at least one storage container, wherein the inputting an instruction step is accompanied by a cashier or supervising person inputting a secret code or utilizing a magnetic stripe card or chip card to authorize the accepting and storing step.

2. The method according to claim 1, wherein the procedure steps f and g are swapped.

3. The method according to claim 1, wherein the instruction to accept and store the returned bank notes comprises information concerning the returned bank notes.

4. The method according to claim 3, wherein the information concerning the returned bank notes is considered in an accounting of the inserted bank notes.

5. The method according to claim 1, wherein bank notes stored in the at least one storage container are dispensed by the apparatus.

6. The method according to claim 5, wherein the bank notes stored according to step g are excluded from being dispensed.

7. The method according to claim 1, wherein the bank notes stored in accordance with method step g are stored separately from checked bank notes in an additional storage container.

* * * * *